United States Patent [19]

Ahrweiler

[11] 4,410,474

[45] Oct. 18, 1983

[54] METHOD AND APPARATUS FOR THE CONTINUOUS MANUFACTURE OF EXTRUDED MATERIALS

[75] Inventor: Karl-Heinz Ahrweiler, Krefeld, Fed. Rep. of Germany

[73] Assignee: Eduard Küsters, Krefeld, Fed. Rep. of Germany

[21] Appl. No.: 312,674

[22] Filed: Oct. 19, 1981

[30] Foreign Application Priority Data

Nov. 27, 1980 [DE] Fed. Rep. of Germany ....... 3044671

[51] Int. Cl.$^{3}$ ............................................ B29J 5/08

[52] U.S. Cl. .................................... 264/109; 425/371

[58] Field of Search ......................... 264/109; 425/371

[56] References Cited

U.S. PATENT DOCUMENTS 3,863,908 2/1975 Charpentier ........................ 264/109

4,216,179 8/1980 Lamberts et al. .................. 425/371

*Primary Examiner*—Maurice J. Welsh

*Attorney, Agent, or Firm*—Kenyon & Kenyon

[57] ABSTRACT

A method and apparatus for the continuous manufacture of extruded material such as chip board, plastic board and similar materials, in which the material to be pressed is conducted, in a pressing section, between endless forming bands which co-circulate the feeding direction of the extrusion, extend over the width of the extrusion and through which pressure and optionally heat are introduced into the material. To aid the feed and reduce stresses, at a point following the pressing section, a pulling force in the feeding direction is exerted on the extrusion of the finished material.

11 Claims, 4 Drawing Figures

METHOD AND APPARATUS FOR THE CONTINUOUS MANUFACTURE OF EXTRUDED MATERIALS

BACKGROUND OF THE INVENTION

The invention relates to a method and apparatus for the continuous manufacture of extruded materials in general and more particularly to such a method in which feeding forces are reduced.

Such a method and apparatus for the continuous manufacture of extruded material such as chip board, plastic board and similar materials, in which the material to be pressed is conducted between endless forming bands which co-circulate in a pressing section is described in DE OS No. 21 577 746, for example. The forming bands circulate in the feeding direction of the extrusion and extend over the width of the extrusion. Pressure and optionally heat are introduced through the forming bands into the material.

The band presses may be of different design. A first possibility is that according to DE-OS No. 21 57 746, in which the material to be pressed is guided between forming bands of sheet steel which are supported on the back side via co-circulating roller chains. German Pat. No. 936 718, on the other hand, discloses a band press in which co-circulating steel bands are supported via co-circulating plate chains which have rolls on the back side which roll against support tracks. Band presses, in which the forming band itself consists of individual strip-like plates which are linked together along a line extending cross-wise to the extrusion can also be used. Forming bands which are supported by means of continuous rolls extending across the width of the extrusion as well as forming bands which are guided past a support structure with sliding friction also can be considered in this type of apparatus.

The present invention is directed to the solution of a problem which arises if especially thick plates or blocks are to be produced on a press of this type, in which the dimensions of the sides of the rectangle forming the cross section are of the same order of magnitude. For, in the manufacture of such especially thick chip boards or chip blocks, the material is squeezed out from between the forming bands at the sides under high pressure if, on a normal chip board press, the necessary, very high chip piling is run into the pressing section. In order to prevent this it is absolutely necessary to provide seals at the sides of the press in these cases, in order to keep the cross section of the material extrusion which is being formed rectangular.

While these seals can theoretically be designed as co-circulating seals, the effort connected therewith, especially if band presses with variable thickness of the material extrusion being produced are involved, is so great that practically only a stationary seal can be considered for economic reasons. In a mass of chips quasi-hydrostatic conditions prevail under high pressure, so that a considerable part of the pressure to be transmitted to the forming band is also found as a pressure acting in the transverse direction against the seals, and the friction to be overcome by the material extrusion or the band press is thus very considerable.

The feeding forces are transmitted, in many of the known press designs, especially of those according to DE-OS No. 21 57 746, through the forming bands. These are deflected over drums at the ends and the bending stresses due to the deflection are further superimposed on the pure tensile stress in the deflection region. The total stress resulting therefrom exceeds the permissible material stresses in the forming band if stationery seals are used.

It is an object of the present invention to develop a method and apparatus of the type discussed above in which the feeding forces to be transmitted by the forming bands are reduced.

SUMMARY OF THE INVENTION

This problem is solved by exerting a pulling force in the feeding direction on the extrusion of the finished material, at a point following the pressing section, to aid the feed.

After leaving the pressing section, the material extrusion (web) is solidified in many cases in such a manner (for instance, in the case of wood chips bonded by phenolic resin), that the forces necessary for supplying the pulling force can be exerted on it without damage. By additionally pulling the material extrusion which has been formed itself, the band press and, in particular, its forming bands, are relieved of supplying part of the feeding forces so that the stresses occurring can be kept within permissible limits.

The preferred application is the case already described in which particularly thick material extrusions, for instance, beam-like chip bodies are produced and in which particularly high feeding forces occur due to the requirement for sealing. However, the present invention is not tied to this case but can also find other applications if, for reasons related to the material or for reasons related to the band press, very high feeding forces are absolutely necessary or the feeding forces transmitted by the forming bands are to be reduced.

The pull can be exerted so as to be constant in time so that the material extrusion is therefore continuously under constant tension during its advance, or the procedure can be cyclic in that the extrusion advances intermittently and the pull is exerted during the advancing phases before the advance is accomplished.

The apparatus according to the present invention may comprise a pulling device which engages the outer surface of the finished extrusion of the material leaving the pressing section of the band press. There are many possibilities of designing the pulling devices.

It may be designed as a band press or comprise drums which are arranged opposite each other transversely to the material extrusion, over the circumference of which normally narrow plates, aligned approximately tangentially, are distributed, for instances, in the manner of early cannon wheels. The plates come to a rest on opposite surfaces of the finished material extrusion and carry the extrusion along by friction when the drum rotates. The advantage of this design is that the contact pressure is transmitted not on a line such as with direct contact of the drum on the material extrusion, but over an area.

The pulling device may, however, also comprise pairs of opposite cylinders. In this case, however, the force transmission is along a line and is not so favorable because of the high specific pressure. If, however, the cylinders have a friction increasing surface, for instance, if they are roughened, grooved, fluted or provided with points, a considerable pull can be transmitted by cylinders. The surface of the material extrusion formed is then affected, of course, which however is permissible in many cases if the material extrusion is further machined at the surface anyway.

The above-mentioned pulling devices operate constantly.

A pulling device which executes a stroke cyclically may also be used. An embodiment of this device which is directed toward an automatic application of the clamping force during each stroke is also possible.

DETAILED DESCRIPTION

Figures 1, 2, 3, 4:
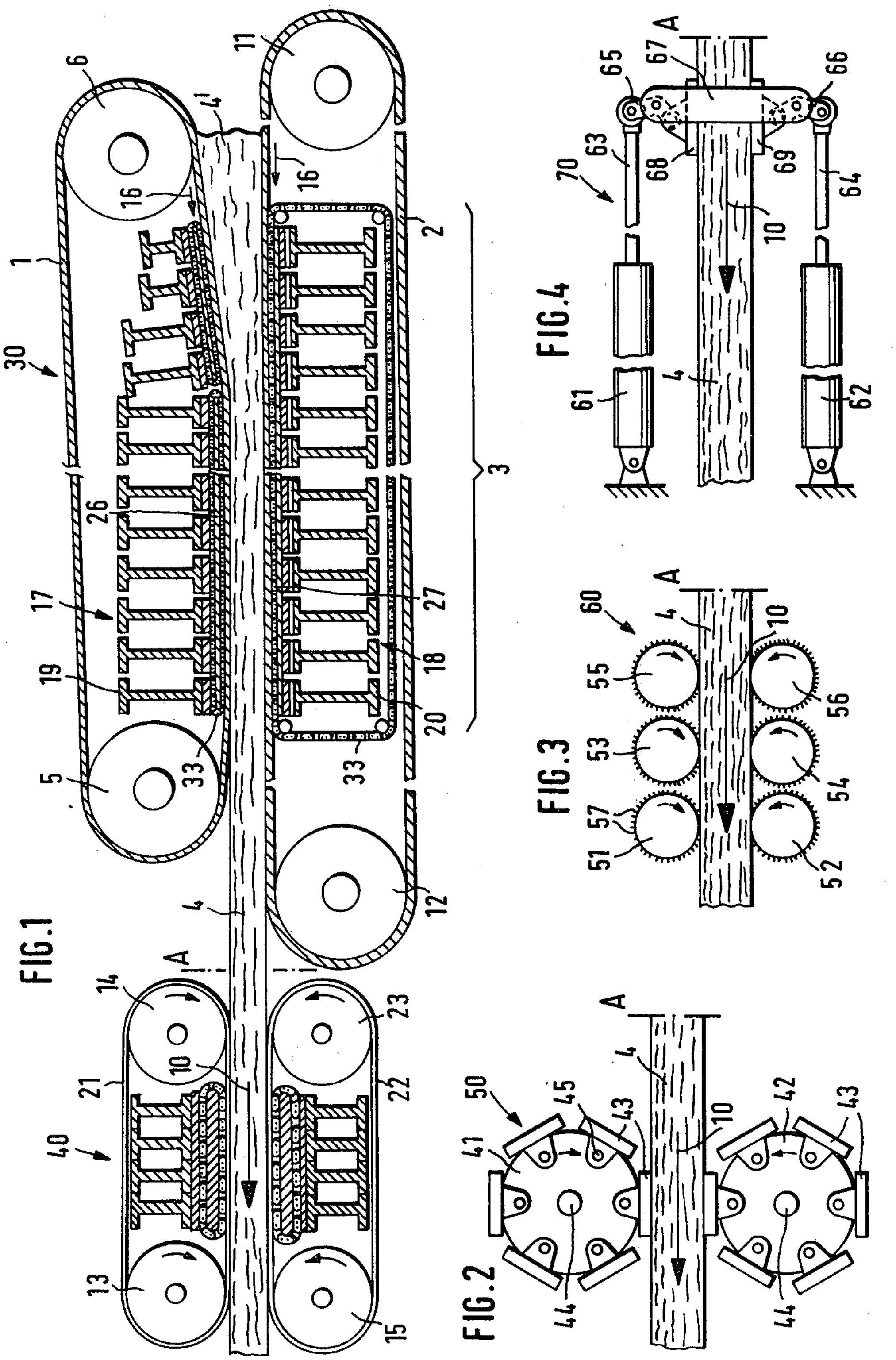
FIG. 1 is a longitudinal vertical section through apparatus according to the present invention for the manufacture of thick molded bodies of wood chips.
FIGS. 2 to 4 illustrate alternate embodiments of the part to the left of line A in FIG. 1.

According to FIG. 1, the apparatus of the present invention comprises a band press 30 for manufacturing a material extrusion 4 as well as a following band press 40, by means of which a pull in the direction of the arrow 10 can be exerted on the finished material extrusion 4.

The upper forming band 1 of the band press 30 rotates about drums 5 and 6 arranged transversely to the material extrusion 4, and the lower forming band 2 rotates about the drums 11 and 12. The forming bands 1 and 2 are driven by the drums.

The forming bands 1 and 2 move through the band press 30 in the direction indicated by the arrows 16, so that the mass of material 41 to be pressed, which is applied on the right side in FIG. 1, by devices, not shown, is pulled into the pressing section 3 and is densified and hardened there. The compressed and hardened material extrusion 4 which comes out at the left end of the band press 30 runs immediately into the pulling device 40 which is likewise designed as a band press.

In the pressing section 3, inside the forming band 1 is an upper support structure 17, which cooperates with a lower support structure 18 inside the lower forming band 2. Support structures 17 and 18 brace the regions of the forming bands 1 and 2 facing the material extrusion 4 against the resistance of the material extrusion 4 and press these regions against the material extrusion 4 with a large force over a large surface.

The support structures 17 and 18 each consist of individual beams 19 and 20 which are arranged opposite each other above and below the forming bands 1 and 2 and the material extrusion 4. Each pair of beams 19 and 20 is clamped together laterally outside the material extrusion, so that individual pressure members are formed which are closed in themselves from a force standpoint. Between the beams 19 and 20 and the forming bands 1 and 2 are strong plates 26 and 27 which transmit the forces exerted by the individual pressure members 19 and 20 evenly to the forming bands 1 and 2 and which contain canals in which heating elements are arranged or through which a heating medium is conducted.

Between the sides of the plates 26 and 27 facing each other and the forming bands 1 and 2 are roller chains 33 on which the forming bands 1 and 2 roll relative to the plates 26 and 27. Roller chains 33 circulate endlessly about the plates 26 and 27 in a vertical longitudinal plane. The rollers of the roller chains 33 transmit the pressure as well as the heat of the plates 26 and 27 to the forming bands 1 and 2 and, thereby, to the material extrusion 4.

The roller chains 33, after they have arrived at the end of the pressing section 3, can be returned in the pressing section proper in suitable canals between the beams 19 and 20 and the plates 26 and 27, as is indicated in FIG. 1 for the plate 26. However, it is also possible to lead the roller chain on the outside around the support structure as can be seen for the support structure 18 in the bottom of FIG. 1.

The design of the band press forming the pulling device 40 corresponds substantially to that of the band press 30. Steel bands 21 and 22 which rotate around drums 13 and 14 and 15 and 23 are provided and driven in the direction indicated. In the pressing region, bands 21 and 22 rest against the upper and lower side of the material extrusion 4. The contact pressure is generated in the same manner as in the band press 30. Also in the case of the pulling device 40, the support of the bands 21 and 22 is accomplished via circulating roller chains. A force is exerted on the material extrusion 4 via friction.

In FIG. 2, a pulling device 50, which can be used instead of the pulling device 40, is shown. Device 50 comprises two opposite drums 41 and 42, which extend transversely to the material extrusion 4. Drums 41 and 42 are driven in the direction indicated. At the circumference of the drums 41 and 42 narrow plates 43, which extend over the width of the material extrusion 4, are attached. The plates 43 can swivel over a certain angular range about axes 45 arranged parallel to the axis 44 of the drums 41 and 42, so that they rest flat on the upper and lower sides of the material extrusion 4 when the drums 41 and 42 rotate. The width of the plates 43 is chosen so that they cover almost the entire circumference of the drums 41 and 42 but do not mutually interfere in their swivel motion.

The plates 43 exert a pressure directed perpendicular to the material extrusion 4. This pressure can be generated by pressing the axes 44 of the drums 41 and 42 toward each other, or by suitable structures, by means of which the plates 43, when they reach the material extrusion 4, are pressed away from the drums 41 and 42 against the surfaces of the material extrusion 4.

In FIG. 3, a pulling device 60 is shown which has three pairs of cylinders 51 and 52; 53 and 54; and 55 and 56 which are opposite each other on opposite sides of the material extrusion 4, and which are arranged with their axes transverse to the material extrusion. The cylinders are driven in the direction indicated and are pressed by an external force perpendicularly against the surface of the material extrusion. To increase their grip, the pairs of cylinders may have a relief in the form of ribs, flutes or points, at their surface as is indicated at 57. Also a covering with grainy material is suitable.

FIG. 4 shows a pulling device which, contrary to the pulling devices 40, 50, and 60, operates cyclically. It comprises hydraulic cylinders 61 and 62 which are arranged on opposite sides of the material extrusion 4. Piston rods 63 and 64 of cylinders 61 and 62 engage toggle levers 65 and 66 which are supported at cross pieces 67 arranged laterally outside the material extrusion 4. The free ends of levers 65 and 66 act on plates 68 and 69 on the upper and lower side of the material extrusion 4. The web of material 4 is clamped between the plates 68 and 69 and is pulled in the direction of the arrow 10. Piston rods 63 and 64 are drawn into cylinders 61 and 62. Clamping and disengaging take place automatically. Since levers 65 and 66 rotate about fixed points on cross pieces 67, movement of rods 63 and 63 in the direction of arrow 10 results in a clamping action. During the back stroke, the plates 68 and 69 detach automatically themselves. The movement of rods 63 and 64 in the opposite direction causes levers 65 and 66 to rotate clockwise to lift plates 68 and 69 away from extrusion 4.

The material extrusion 4 is pulled cyclically through the associated band press 30, by means of such a pulling device. The drive of the band press 30 is advantageously shut off during the return phases while the cylinder units 61 and 62 execute the back stroke.

What is claimed is:

1. In a method for the continuous manufacture of extruded material by pressing, in which the material to be pressed is conducted in a pressing section between endless forming bands which co-circulate in the feeding direction of the extrusion, extend over the width of the extrusion and through which pressure and optionally heat are introduced into the material, the improvement comprising, exerting a pulling force on the extrusion of the finished material, in the feeding direction, at a point following the pressing section, to aid the feed.

2. The method according to claim 1, wherein said pull is constant in time.

3. The method according to claim 1, wherein, the extrusion advances cyclically and said pull is also exerted cyclically during the advances.

4. In apparatus for the continuous manufacture of extruded material including a band press having a pressing section in which a material extrusion is conducted between endless forming bands which co-circulate in accordance with the feed direction of the web and extend over the width of the web and which are braced against a support structure provided above and below the material extrusion, the improvement comprising, a pulling device which engages the outer surface of the finished extrusion of the material leaving the pressing section of the band press following the band press and exerts a force in the feeding direction on said finished extrusion.

5. The improvement according to claim 4, wherein said pulling device comprises a band press having forming bands resting on opposite surfaces of the finished material extrusion with frictional contact.

6. The improvement according to claim 4, wherein said pulling device comprises at least one pair of driven drums disposed opposite each other on opposite sides of the material extrusion transverse to the material extrusion, narrow plates, which are normally aligned approximately tangentially and supported to swivel over an angular range about axes extending parallel to the drum, disposed over the circumference of the drums and means causing said plates to rest under pressure against opposite surfaces of the finished material extrusion when said drums rotate.

7. The improvement according to claim 4, wherein said pulling device comprises at least one pair of driven cylinders arranged opposite each other on opposite sides of the material extrusion transverse to the material extrusion and means causing said cylinders to rest under pressure on opposite surfaces of the finished material extrusion.

8. The improvement according to claim 7, wherein said cylinders have means for increasing friction on their surfaces.

9. The improvement according to claim 4, wherein said pulling device comprises at least one linear drive which operates parallel to the feed direction of the finished material extrusion.

10. The improvement according to claim 9, wherein said drive is firmly supported on one side and includes, at its other end a clamping device for engaging opposite surfaces of the material extrusion.

11. The improvement according to claim 10, wherein said clamping device comprises a lever arrangement by means of which the pulling force of the drive can be converted into a clamping force.

* * * * *